Feb. 10, 1959     J. E. JENDRISAK     2,872,756
APPARATUS FOR FORMING CURVED GLASS PANES
Filed Feb. 7, 1955     3 Sheets-Sheet 2
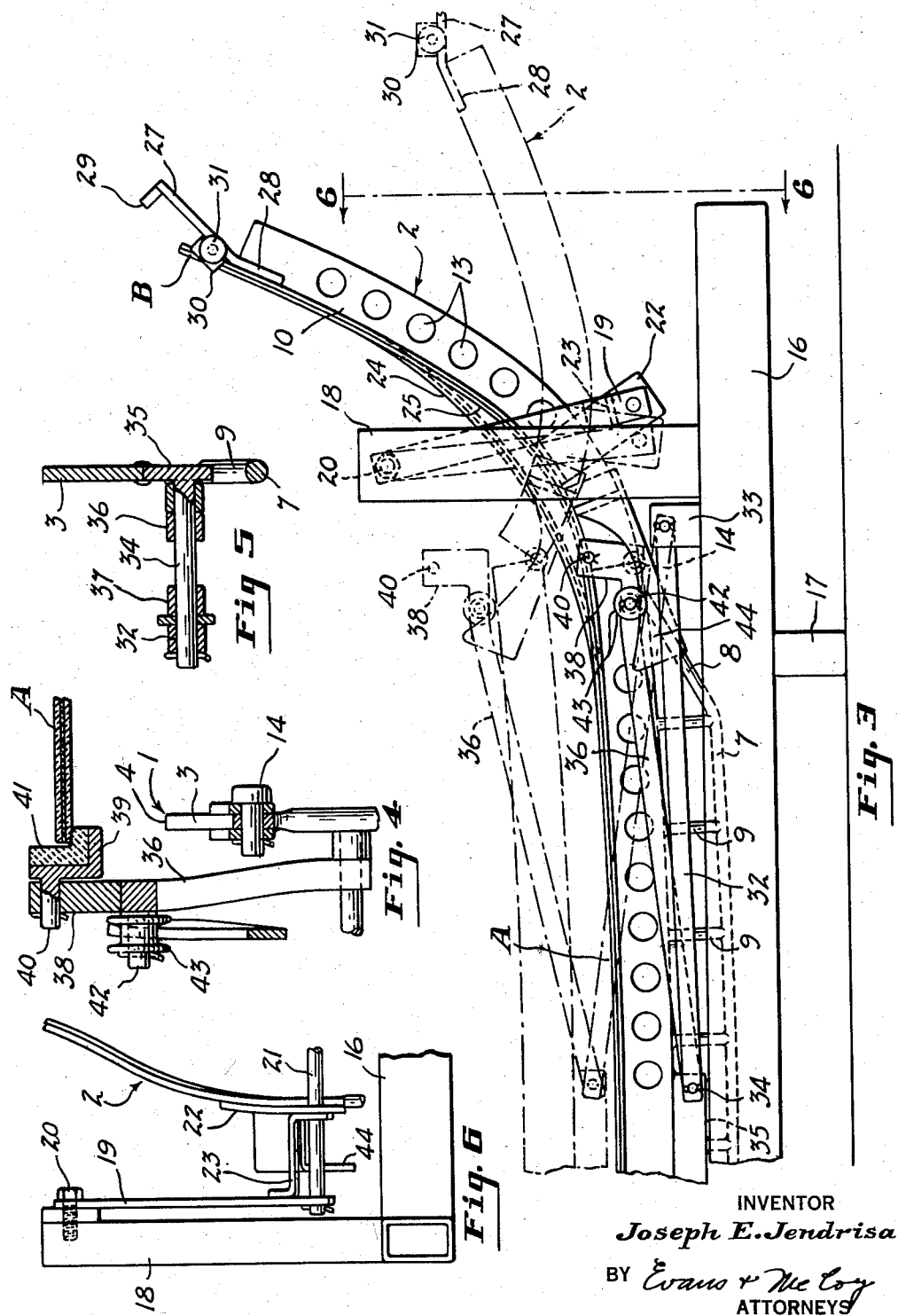
INVENTOR
Joseph E. Jendrisak
BY Evans & McCoy
ATTORNEYS

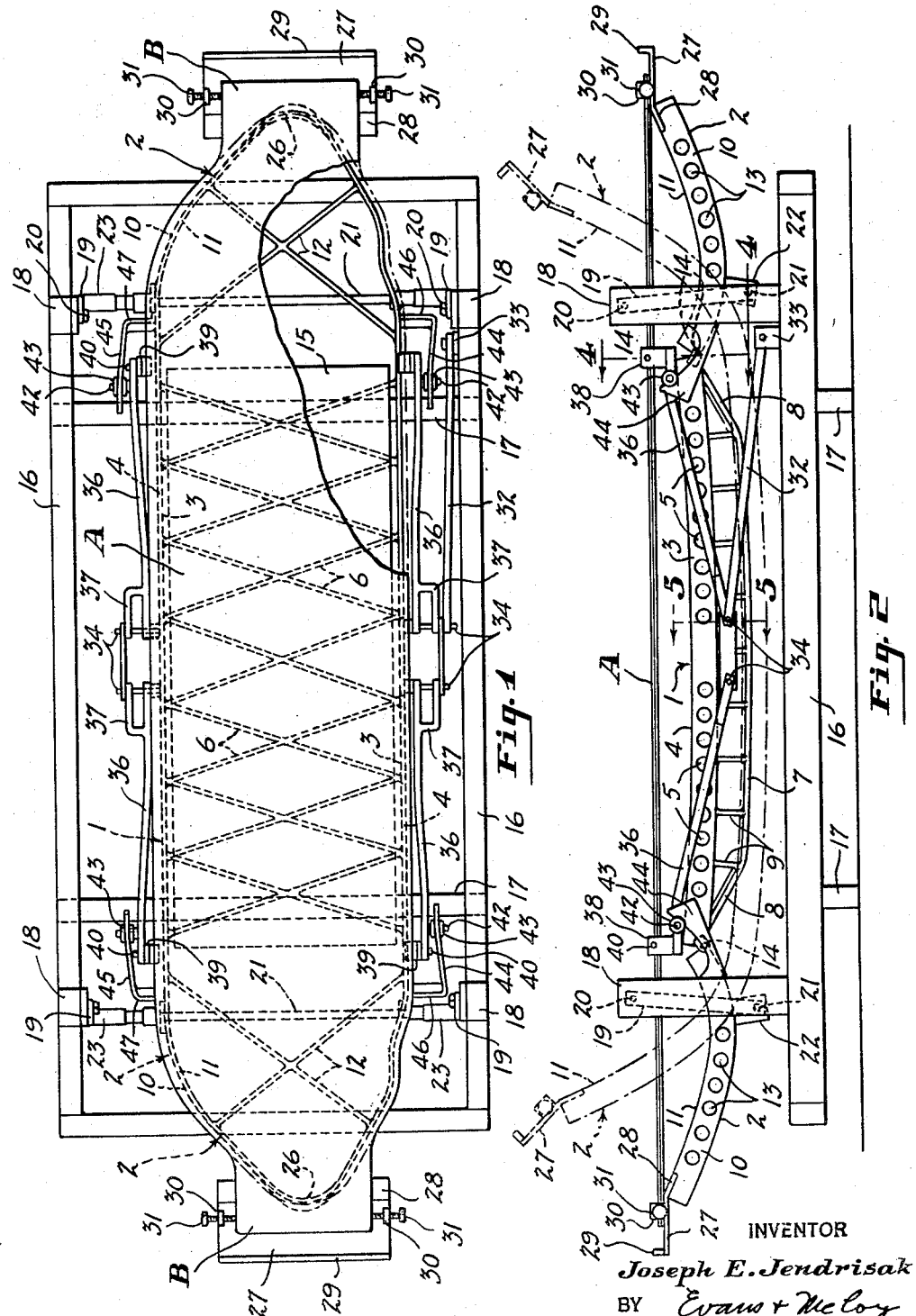

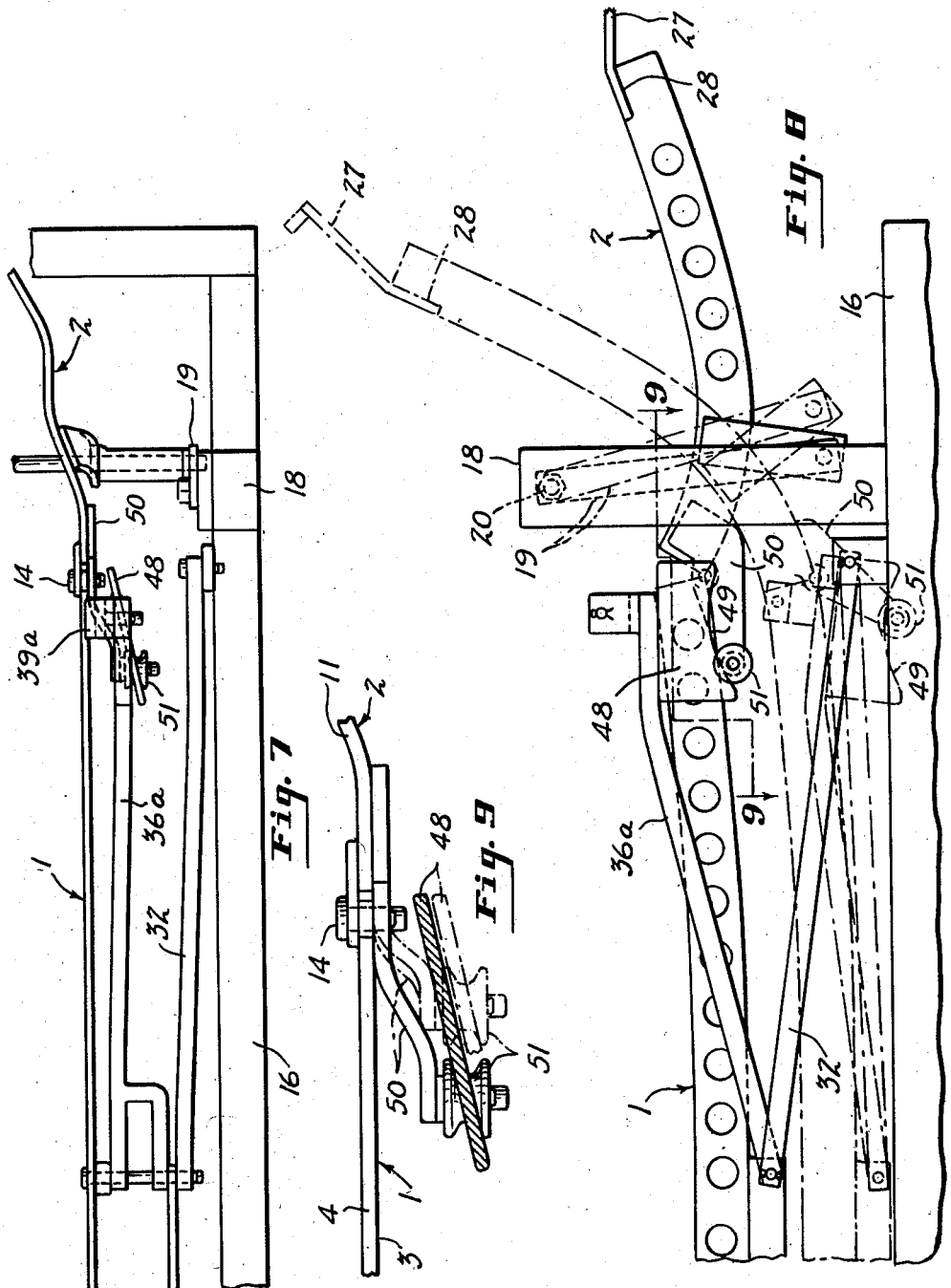

United States Patent Office 2,872,756
Patented Feb. 10, 1959

2,872,756

APPARATUS FOR FORMING CURVED GLASS PANES

Joseph E. Jendrisak, Northville, Mich., assignor to Shatterproof Glass Corporation, Detroit, Mich., a corporation of Michigan Application February 7, 1955, Serial No. 486,562

9 Claims. (Cl. 49—67)

This invention relates to the forming of curved glass panes such as used for panoramic windshields or rear automobile windows, and more particularly to apparatus for bending heated glass sheets to the desired contour.

In forming curved glass panes with the apparatus of the present invention a flat sheet of glass is supported at its ends over a concave form or mold and subjected to heat which decreases the rigidity of the glass to a point where the weight of the glass sheet is sufficient to cause downward sagging between the end supports and the movement of the glass sheet into the mold is controlled by yieldably supporting the glass intermediate its ends in such manner as to cause the glass to be bent to nearly the desired contour before it contacts the mold to avoid marring the glass by sliding engagement of highly heated portions of its surface with the shaping surface of the mold.

The mold is constructed to provide a continuous narrow marginal portion that conforms to the shape of the curved pane closely adjacent its margin where the pane will be engaged by the frame in which it is to be mounted, thereby accurately forming the margin of the pane so that bending stresses will not be set up in the pane when it is secured in its frame.

The mold is made of light weight and of small heat absorbing capacity so as to avoid too rapid cooling or chilling of the glass by transfer of heat to the mold which would have a tendency to create stresses in the glass that would result in cracking. The mold is effectively braced in such manner that distortion thereof by heat is very slight and so that it can withstand repeated heatings to a high temperature without becoming permanently distorted.

The flat glass to be bent is preferably supported on vertically movable end supports and intermediate auxiliary supports that have counterbalancing connections which cause the intermediate supports to move upwardly when the end supports move downwardly so that when the flat glass is placed upon the end supports the end supports move downwardly and the intermediate supports move upwardly into engagement with the pane and take a portion of the weight thereof. When the glass is softened by heat, loss of rigidity causes more weight to be imposed upon the intermediate supports, moving them downwardly and imparting an upward movement to the end supports. The intermediate supports are preferably engageable with the marginal portions only of the panes and are so guided during their downward movement as to accurately position the pane with respect to the mold at the instant of contact.

The mold, which has the shape of an automobile windshield or rear window with sharply curved ends, is preferably formed with an elongated center section that is supported in substantially horizontal position and that has a slightly concave top shaping surface and shorter end sections that are hinged to the central section and that extend upwardly therefrom. The end sections of the mold are preferably pivoted to the central section and serve as the end supports for the glass to be bent, counterbalancing connections being provided between the end sections and the intermediate supports that cause the flat glass to be normally supported above the central section and out of contact with the shaping surfaces of both the central section and the end sections, the intermediate supports being positioned adjacent the ends of the central section and being movable up and down from and to a position below the shaping surface of the central section so that the intermediate supports move out of contact with the glass just prior to engagement of the glass with the mold.

To facilitate the placing of the glass on the supports, the mold is preferably mounted on a supporting frame in such manner that the end sections have endwise movement in the frame and pivotal movement with respect to the frame about horizontal axes spaced outwardly of and parallel to the hinge connections between the mold sections so that the center section is moved upwardly when end sections are moved downwardly. The weight of the center section is sufficient to overbalance the weight of the end sections to normally hold the same in their uppermost molding positions but insufficient to overbalance the end sections with the weight of the glass to be bent imposed thereon. The movement of the intermediate supports is so controlled that the glass is held clear of the central section during sagging movement of the glass while the end sections are moving upwardly and the central section downwardly to molding position.

Since automobile windows are of the sandwich type composed of two sheets of glass cemented to an intermediate sheet of transparent plastic, a pair of superimposed glass sheets are preferably simultaneously molded, the bottom sheet engaging and conforming to the mold, the top sheet being supported on and conforming to the bottom sheet.

Important objects of the invention are to provide an apparatus for bending glass panes to the desired curved shape with great accuracy so that local stresses will not be set up in the panes when they are mounted in their frames, to provide an apparatus for gravity bending of heated glass panes to the desired contour without impairing the optical qualities of the glass, and to provide a form or mold that will not be appreciably distorted by the heat to which it is subjected during the forming operation and which will not have an objectionable chilling effect on the glass panes.

Reference should be had to the accompanying drawings forming a part of this specification, in which:

Figure 1 is a top plan view of the pane forming apparatus embodying the invention;

Fig. 2 is a side elevation of the apparatus shown in Fig. 1;

Fig. 3 is a fragmentary side elevation on an enlarged scale at one end of the forming apparatus;

Fig. 4 is a fragmentary vertical section on an enlarged scale taken on the line indicated at 4—4 in Fig. 2;

Fig. 5 is a fragmentary vertical section on an enlarged scale taken on the line indicated at 5—5 in Fig. 2;

Fig. 6 is a fragmentary end elevation viewed as indicated at 6—6 in Fig. 3;

Fig. 7 is a fragmentary top plan view showing a modified form of counterbalancing connection between an end section and one of the intermediate supporting members;

Fig. 8 is a fragmentary side elevation of the connection shown in Fig. 7; and

Fig. 9 is a top plan view of the cam and roller on a scale larger than that shown in Fig. 7.

As shown in the accompanying drawings, the mold of the present invention comprises a center section 1 and end sections 2, the center section 1 being horizontally disposed and conforming to the slightly curved body portion of the curved pane to be formed, and the end section conforming to the more sharply curved end portions of the pane and extending upwardly from the central section. The central section 1 has flat metal side straps 3 with narrow top edges 4 that conform to edge portions of the curved glass pane to be formed. The side straps 3 are lightened by spaced openings 5 and are connected by crossing diagonal braces 6 which are welded at their ends to the inner faces of the side straps 3 below the top edges of said straps. The side straps 3 are provided with longitudinal truss-like braces formed by a tension chord 7 having upwardly inclined end portions 8 welded to the bottom edge of the straps 3 near the ends thereof and connected intermediate the ends by spaced vertical posts 9 welded at their upper ends to the straps 3 and at their lower ends to the chord 7.

The end sections 2 are symmetrical and are provided with marginal straps 10 that have narrow top edges 11 which form continuations of the shaping surfaces formed by the top edges 4 of the side straps 3 of the central section. The end sections 2 are also reinforced by crossing diagonal braces 12 and the straps 10 are lightened by spaced holes 13. The end sections 2 are connected to the center section 1 by horizontally disposed hinge connections 14 that connect the ends of the side straps 3 to the marginal straps 10 of the end sections, the hinged connections 14 being below the top edges of the straps 3 and 10 and the straps 3 and 10 having end edges which abut when the end sections 2 are in their uppermost molding positions.

The bracing members 6, 7, 9 and 12 are all of light weight so that the mold has a small heat absorbing capacity and does not have an objectionable chilling effect on the heated glass pane when it is brought into contact therewith. To further decrease the weight, all of the bracing members are preferably of tubular form and, to reduce distortion under heat, are preferably formed of a metal having a coefficient of expansion less than that of the side straps 3 and 10. For example, the straps 3 and 10 may be formed of cold rolled steel and the tubular bracing members may be formed of stainless steel.

In order to prevent overheating and transverse sagging of the central portion of a glass pane after it has been bent into conformity with the margin of the mold, a sheet of asbestos 15 may be supported on the cross braces 6 of the central section. To effect the heating of the glass pane, the mold is passed through a heating furnace which is so designed as to apply more heat to the end portions of the panes than to the center thereof, to restrict the bending largely to the end portion of the pane and, in order to provide supports for the molds traveling through the furnace, the molds are mounted in a suitable rectangular frame 16 which may be supported on transverse runners 17 that are adapted to rest on driven rollers that form the bed of the heating furnace.

The end sections 2 of the mold are mounted in the frame 16 for pivotal movement with respect to the center sections on the hinge connections 14 and for bodily movements in the frame. As shown herein, a pair of laterally spaced posts 18 are provided adjacent each end of the frame 16 and links 19 are suspended from axially alined pivots 20 near the uper ends of the pair of posts 18. The lower ends of the links 19 carry parallel transverse shafts 21 that extend through brackets 22 attached to the sections 2 to pivotally support the end sections 2 of the mold. The mold is held against lateral movements on the shafts 21 by means of spacers 23 attached to the lower ends of the links 19 and engaging the brackets 22. Rocking movements of the end sections 2 on the shafts 21 impart swinging movements to the supporting links 19 and vertical movements to the center section 1.

In order to form the glass pane to the shape of a windshield or rear automobile window, one side of the pane must be bent to a sharper curvature than the other and the ends of the pane which taper to a tip are offset from the center line of the pane. Consequently, the mold is formed adjacent the juncture of the center section with the end sections, with side portions 24 and 25 that are of different curvatures and each section 2 of the mold has a tip portion 26 that is offset with respect to the center line of the mold.

The pivoted end sections 2 preferably form the end supports for the glass to be bent and each of these sections has a plate 27 attached to the tip portion thereof that serves as a ledge for supporting the ends of the glass sheets. The glass receiving portion of each plate 27 is entirely beyond the tip 26 of the shaping surface and each plate has an angularly disposed inner end portion 28 that is shaped to straddle the tip portion 26 of the strap 10 with its top face substantially flush with the top edge 11. The plate 27 is rigidly attached to the strap 10 by suitable means such as welding and is provided with an upturned flange 29 at its outer end and with upstanding lugs 30 on opposite sides thereof that receive positioning screws 31.

As shown in Figs. 1 and 2, a pair of superposed glass sheets A may be placed with lowermost pane in engagement with the supporting ledges 27. The sheets A are preferably cut to the form of the finished pane except for narrow extensions B at opposite ends thereof that are received on the supporting plates 27 between the screws 31 which can be adjusted to properly position the panes with respect to the mold.

The weight of the center section 1 of the mold is sufficient to overbalance the weight of the two end sections 2 of the mold and hold them in their molding positions, as shown in full lines in Fig. 3 and in dotted lines in Fig. 2. The weight of the center section is, however, insufficient to overbalance the weight of the end sections 2 with glass sheets A imposed thereon so that the weight of the glass causes the end sections 2 to be swung downwardly and the center section 1 to be moved upwardly, this movement being permitted by the suspension links 19 which swing outwardly to permit rocking of the end sections 2. A link 32 is pivoted at one end to a bracket 33 and at its inner end to one of a pair of spaced pins 34 carried by the central mold section 1 near the center thereof, the links 32 serving to restrain longitudinal movements of the section 1 and to keep it centered with respect to the posts 18. In order to prevent upward movement of the central section 1 into engagement with the under side of the glass supported on the end sections 2, means is provided for limiting the upward movement of the section 1 with respect to the glass supported on the end sections and for supporting the glass out of contact with the center section 1.

The pins 34 project from plates 35 welded to the bottom edge of the side straps 3 midway between their ends and the pins 34, which are horizontal and parallel, provide support for four pivoted arms 36 that have forked ends 37 journaled on the pins 34 and that extend to adjacent the opposite ends of the central section 1. At their outer ends each of the arms 36 has an upwardly projecting portion 38 which provides support for an L-shaped glass supporting member 39 that is suspended by a pivot 40 from the end portion 38 of the arm. Each of the supports 39 has a short flange underlying an edge portion of the glass panes A and is provided with a facing 41 of a ceramic refractory material of low heat conductivity. Each of the arms 36 has an outwardly projecting shaft 42 rigidly attached thereto adjacent the upwardly projecting portion 38 thereof and each of these shafts carries a grooved roller 43. The rollers 43 at each end of the central section engage with cams 44 and 45 that are in the form of plates with curved top edges on which the grooved rollers 43 rest. The cams 44 and 45 are attached to the end sections 2 and have inwardly bent attaching portions 46 which serve to space them outwardly from the marginal portions of the mold. The cams 44 and 45 extend past the hinged connections 14 between the mold sections and are laterally inclined with respect to the side straps 3 of the center section so that a lateral movement is imparted to the glass panes as they are being lowered into engagement with the mold. The arms 36 and cams 44 and 45 provide counterbalancing connections between the end sections 2 and the individual intermediate glass supports. When the glass panes are placed on the end ledges 27 the end sections 2 are rocked downwardly, causing the cams 44 and 45 to move upwardly and lift the arms 36 to bring the supporting members 39 into engagement with the edges of the glass pane and to arrest the upward movement of the center section 1 in the position shown in Fig. 2, the glass being supported partially by the end sections 2 and partially by the intermediate supporting members 39.

In passing through the furnace the end portions of the glass panes are heated to the softening point so that less weight is imposed upon the ledges 27 and more weight is imposed upon the supporting members 39. This causes the arms 36 to swing downwardly and the sections 2 to swing upwardly. The cams 44 and 45 are so formed that the supports 39 remain above the ends of the central mold section 1 while the end sections 2 are moving upwardly and the center section 1 is moving downwardly to a molding position, the movement of the supporting members 39 being so regulated by the cams that the supporting members 39 move to a position below the top edges 4 just before the central mold section reaches its lowermost position.

During the downward sagging movement of the glass panes an upward bending thrust is imposed upon the end sections 2 to increase the rapidity with which the end portions of the pane are bent so that the end portions of the glass pane are bent to substantially the form of the mold before coming into contact with any part of the mold. Because of the sharper bend at one side of the mold, it is necessary in order to obtain accurate alinement of the margin of the pane with the marginal shaping surfaces of the mold, to bodily shift the pane during its sagging movement and this is accomplished by the lateral inclination of the cams 44 and 45.

In Figs. 7, 8 and 9 a modified form of counterbalancing connection between the end sections 2 and the intermediate supports is shown. In this modification the arm pivoted to the central section which carries the auxiliary intermediate support carries a cam which engages a roller on an arm rigidly attached to the end section. As shown in Figs. 7, 8 and 9, the center section 1 has an arm 36a which corresponds to the auxiliary supporting arm 36 previously described except that it has a cam plate 48 rigidly attached thereto that is provided with a curved bottom edge 49 which acts through an arm 50 rigidly attached to the end section 2 to provide a counterbalancing connection between the auxiliary support and the end section, the arm 50 having a grooved roller 51 that receives the curved edge 49 of the cam plate 48. The cam plates 48 are inclined laterally with respect to the mold to impart a lateral movement to the glass pane as it sags into the mold in the same way as in the modification first described.

It is to be understood that in accordance with the provisions of the patent statutes, variations and modifications of the specific devices herein shown and described may be made without departing from the spirit of the invention.

What I claim is:

1. Apparatus for forming curved glass panes by gravity bending of the panes while heated comprising a mold having a central section and vertically swinging end sections having a hinge connection to the ends of said central section, said mold having a smoothly curved longitudinally concave shaping surface when said end sections are in their uppermost molding positions, said end sections having pane supporting ledges at their free ends, four supporting members mounted for vertical movement from and to a position below said surface, said members being positioned two on each side of said central section and adjacent the ends thereof and being engageable with the side edges of a pane and with the under side thereof adjacent said side edges, and a counterbalancing connection between each of said end sections and the two adjacent supporting members constraining said end sections and supporting members to movements in opposite directions whereby the weight of a pane is initially supported partially by said end sections and partially by said supporting members and weight imposed upon said supporting members by a heated pane sagging between said supporting ledges imparts an upward movement to said end sections to move them to their molding positions.

2. Apparatus for forming curved glass panes by gravity bending of the panes while heated comprising a mold having a central section and vertically swinging end sections having a hinge connection to the ends of said central section, said mold having a smoothly curved longitudinally concave shaping surface when said end sections are in their uppermost molding positions, said end sections having pane supporting ledges at their free ends, supporting members carried by said central section on opposite sides thereof and adjacent each of its ends, said members being movable up and down from and to a position below said surface and having portions engageable with the side edges of a pane and with the bottom face of the pane adjacent said edges, arms attached to each of said end sections and projecting past its hinge connection on opposite sides of said central section, and means operably connecting said arms and said supporting members to move the supporting members upwardly upon downward movement of said end sections and to move said end sections upwardly upon downward movement of said supporting members.

3. Apparatus for forming curved glass panes by gravity bending of the panes while heated comprising a mold having a central section and vertically swinging end sections having a hinge connection to the ends of said central section, said mold having a smoothly curved longitudinally concave shaping surface when said end sections are in their uppermost molding positions, said end sections having pane supporting ledges at their free ends, supporting members carried by said central section on opposite sides thereof and adjacent each of its ends, said members being movable up and down from and to a position below said surface and having portions engageable with the side edges of a pane and with the bottom face of the pane adjacent said edges, means for moving said supporting members laterally during their downward movements to shift the pane relative to said mold, a counterbalancing connection between each of said end sections and the two adjacent supporting members constraining said end sections and said supporting members to movements in opposite directions whereby the weight imposed on said supporting members by a heated pane sagging between said ledges imparts an upward movement to said end sections to move them to their molding positions.

4. Apparatus for forming curved glass panes by gravity bending of the panes while heated comprising a supporting frame, a mold comprising a central section and upwardly curved end sections connected to the central section by transverse hinge connections and having pane supporting ledges at their free ends, said sections having face portions which in the uppermost position of said end sections provide a continuous concave pane shaping surface, spaced mold carrying members mounted on said frame for movement longitudinally thereof, pivotal connections between said carrying members and said end sections disposed outwardly of said hinge connections and parallel thereto at distances such that the weight of said central section overbalances said end sections and normally holds them in their uppermost positions and the weight of a pane imposed on the end sections overbalances said central section, auxiliary vertically movable pane supporting members carried by said central section positioned at the ends thereof and movable from a pane supporting position above said face portions to a position below the same, and counterbalancing connections between said supporting members and said end sections.

5. Apparatus for forming curved glass panes by gravity bending of the panes while heated comprising a supporting frame, a mold comprising a central section conforming to the central portion of a curved pane to be formed and end sections conforming to end portions of said curved pane, said end sections having pane supporting ledges at their free ends, supports mounted for longitudinal movement on said frame and pivotally supporting said end sections to swing about horizontal axes, hinge connections between each end section and said central section inwardly of and substantially parallel to said horizontal axes, means connecting said central section to said frame to hold said mold against bodily movement in an endwise direction, pane supporting members mounted for vertical movement on opposite sides of said central section and adjacent the ends thereof, said members being movable up from and down to a position below the top of said central section, arms carried by said sections and engageable with said members to provide a counterbalancing connection between said end sections and said supporting members, whereby an upward thrust may be transmitted to said supporting members that varies with the weight imposed upon said end sections.

6. Apparatus for forming curved glass panes by gravity bending of the panes while heated comprising a supporting frame, a mold comprising a central section conforming to the central portion of a curved pane to be formed and end sections conforming to end portions of said curved pane, said end sections having pane supporting ledges at their free ends, supports mounted for longitudinal movement on said frame and pivotally supporting said end sections to swing about horizontal axes, hinge connections between each end section and said central section inwardly of and substantially parallel to said horizontal axes, pane supporting members mounted for vertical movement on opposite sides of said central section and adjacent the ends thereof, said members being movable up from and down to a position below the top of said central section, arms carried by said end sections and projecting inwardly past said horizontal axes on opposite sides of the mold, and means including a cam connecting each arm to one of said supporting members to move the supporting members upwardly into engagement with a rigid pane resting on said ledges and for regulating the downward movements of said supporting members during the sagging movement of a heated pane to hold the pane out of contact with the central section until said section is substantially in its lowermost position, means for holding said center section against endwise movement.

7. Apparatus for forming curved glass panes by gravity bending of the panes while heated comprising a supporting frame, longitudinally spaced supports, each mounted on said frame to move longitudinally thereof, a mold comprising end sections each pivotally supported on one of said supports to swing about a horizontal axis and a central section pivotally connected to the end sections inwardly of said axes and movable vertically when said end sections are swung about their horizontal axes, said mold being in molding position and having a continuous longitudinally concave shaping surface when said central section is in its lowermost position, said end sections extending upwardly from said central section when in molding position and having pane supporting ledges at their upper ends, the weight of said central section slightly overbalancing the weight of said end sections and normally holding the mold in molding position, means connecting said central section to said frame to hold said section against endwise movements, auxiliary supporting members mounted for vertical movement on opposite sides of the mold adjacent each end of said central section, and counterbalancing connections between each end section and the adjacent auxiliary supports for moving said auxiliary supporting members upwardly into supporting engagement with a flat pane resting on said ledges and overbalancing said center section to transfer a portion of the weight of the pane to said members, each of said connections including a cam for controlling the rate of downward movement of the supporting members to maintain them above said central section during sagging of a heated pane between said ledges until said mold is substantially in molding position.

8. Forming apparatus such as set forth in claim 7 in which said auxiliary supporting members are laterally movable with respect to said mold and in which said cams are formed to simultaneously shift said supporting members laterally during their downward movement to position the heated pane with respect to the mold as it sags into the mold.

9. A collapsible mold for forming curved glass panes by gravity bending while heated comprising a supporting frame, two end sections mounted to swing vertically about horizontal transverse axes intermediate their ends, an elongated center section pivotally supported at its ends on said end sections for downward movements with the inner ends of said end sections from an uppermost glass receiving position to a molding position, each end section having a relatively thin flat metal strap along the sides and around its ends and each center section having a thin flat metal strap along each side thereof, the straps of said center and end sections having end faces that abut when the sections are in molding position and top edges that form a continuous concave shaping surface when the mold sections are in molding position, cross members connecting the straps of said center section below the top surfaces thereof, and a truss-like stiffening means for each of said center section straps comprising a longitudinal tension chord beneath and spaced from its strap and having inclined end portions attached to said strap adjacent the opposite ends thereof and spaced bracing members connected to said chord and said strap intermediate said end portions, said tension chord and bracing members being formed of a metal having a lower coefficient of expansion than the metal of said straps.

References Cited in the file of this patent

UNITED STATES PATENTS

| | | |
|---|---|---|
| 2,021,180 | Galey | Nov. 19, 1935 |
| 2,518,951 | Smith | Aug. 15, 1950 |
| 2,695,476 | Jendrisak | Nov. 30, 1954 |
| 2,736,140 | Black | Feb. 28, 1956 |